Oct. 23, 1928.

J. P. HOTZ 1,688,712

SUPPORT FOR TIRE CHAINS

Filed March 19, 1927

Inventor:
John P. Hotz.
by his atty.
Charles S. Gooding.

Patented Oct. 23, 1928.

1,688,712

UNITED STATES PATENT OFFICE.

JOHN P. HOTZ, OF BOSTON, MASSACHUSETTS, ASSIGNOR OF ONE-HALF TO MANTON A. WOOD, OF BOSTON, MASSACHUSETTS.

SUPPORT FOR TIRE CHAINS.

Application filed March 19, 1927. Serial No. 176,806.

This invention relates to a support for tire chains and has for its object to provide a device upon which tire chains of different sizes may be supported in an outstretched position and in such a manner that the links thereof may be easily and quickly repaired or replaced.

Another object of the invention is to provide a device to which the side members of a tire chain may be detachably connected at their opposite ends, said means embodying therein a pair of spreaders adjustably mounted relatively to each other to accommodate tire chains of different lengths, one of said spreaders embodying therein a means for simultaneously placing a tension upon said side members lengthwise thereof, and both of said spreaders having hangers mounted thereon, each of said hangers being adjustable upon said spreaders laterally of the device to accommodate cross chains of different lengths and longitudinally of the device to provide an auxiliary tensioning means for the side chains.

The invention consists in a support for tire chains as set forth in the following specification and particularly as pointed out in the claims thereof.

Referring to the drawings.

Like numerals refer to like parts throughout the several views of the drawings.

Figure 1:
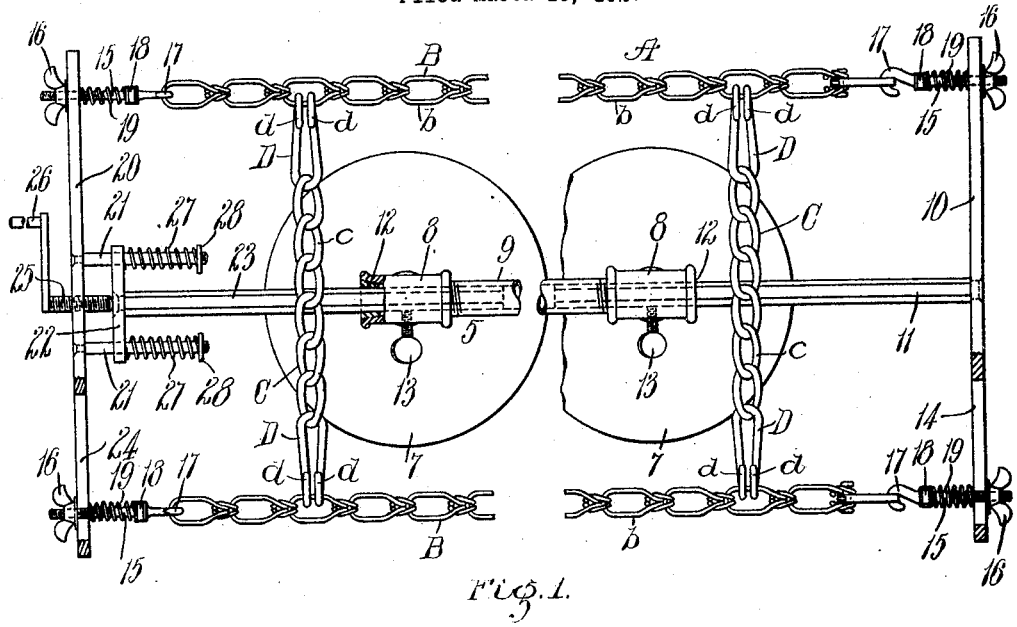
Figure 1 represents a plan view of a support for tire chains embodying my invention, a tire chain being illustrated in position upon said support, and portions of said support and chain being broken away to save space in the drawings and to more clearly illustrate portions that would otherwise be obscured.
Figure 2:
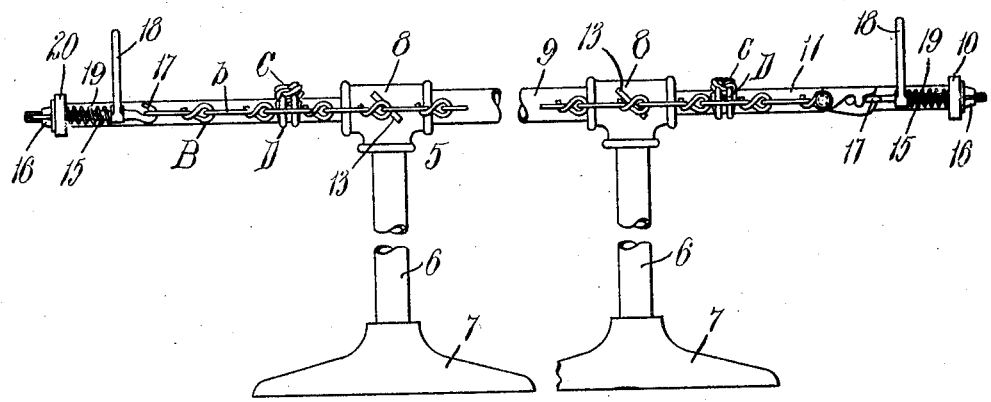
Fig. 2 is a front elevation of the device.

In the drawings, A represents a tire chain of well-known type, said chain embodying therein a pair of side members B, each consisting of a plurality of links b, and a plurality of cross members C, each consisting of a plurality of links c, said cross members being connected to said side members by connecting links D. The chain A is supported upon a frame 5, the latter embodying therein a pair of standards 6, mounted at their lower ends in pedestals 7 and having T's 8 mounted at their upper ends, and the T's of each of said standards are connected together by a tubular connecting member 9.

Mounted upon the frame 5, at one end thereof, is a spreader 10, the latter being rigidly mounted upon a hexagonal bar 11, which in turn is slidably mounted in a bushing 12 mounted in one of the T's 8. The bar 11 telescopes within the T 8 and connecting member 9 and is fastened therein by a thumb screw 13 provided in said T.

The spreader 10 is provided with slots 14, in each of which a hanger 15 is positioned and secured by means of a thumb nut 16, and said hanger has a hook portion 17 formed thereon for attachment to the ends of the side members B of the chain. The hangers 15 are also provided with a handle 18, and a spring 19 surrounds the screw-threaded portion of said hanger and is interposed between the handle portion 18 and the inner surface of the spreader 10.

Another spreader 20 is mounted upon the frame 5 at the opposite end thereof from the spreader 10, and said spreader 20 has a pair of rods 21 rigidly secured thereto, said rods being slidably mounted in a bar 22, the latter being rigidly secured to a hexagonal bar 23, similar to the bar 11 previously mentioned and also slidably mounted in a bushing 12 mounted in one of the T's 8. The bar 23 is adapted to telescope within the T 8 and connecting member 9, and is secured in said T by a set screw 13.

The spreader 20 is slotted at 24 to receive hangers 15, similar to those previously mentioned, and said spreader 20 may be moved relatively to the bar 22 by a screw 25, the latter having screw-threaded engagement with the spreader 20 and contacting at its extremity with an extremity of the bar 23. The screw 25 is rotated by a handle 26, which is rigidly fastened thereto.

Springs 27 are mounted upon the rods 21, the opposite extremities of said springs engaging the bar 22 and collars 28 which are mounted upon the rods 21, and said springs 27 act to force the spreader 20 toward the bar 22 when the screw 25 is rotated in the proper direction.

The general operation of the device hereinbefore specifically described is as follows:—Assuming that the spreaders 10 and 20 have been positioned at the opposite ends of the frame 5 so that the distance separating the hook portions 17 of the hangers 15, which are mounted upon said spreaders, will be approximately equal to the length of the chain that is to be supported, said chain is secured to said hangers by attaching the end portions thereof to the hook portions of said hangers. The hangers 15 are then positioned in their respective spreaders to separate the side chains B to the extent permitted by the length of the cross chains C and the latter are supported midway their length by resting upon the connecting member 9 of the frame 5, or the hexagonal bars 11 and 23. A tension is then placed upon the side members B of the chain A by manipulating the thumb nuts 16 of the hangers 15, and after sufficient tension has been placed upon said side members to pull the latter taut, there will also be sufficient friction between the hangers 15 and the spreaders, to which they are fastened, to hold said hangers positioned in said spreaders.

After the hangers 15 have been adjusted, a further tension may be placed upon the side members B by rotating the screw 25 by means of the handle 26 and forcing the spreader 20 away from its supporting bar 22, at which time the added tension will be placed upon both of the side members B simultaneously. It is evident that a tension may be placed upon the side members B by means of the screw 25 without first manipulating the hangers 15, if it is so desired, and either of the tensioning means described may be employed in placing the tire chain under tension, irrespective of the other means.

Figure 3:
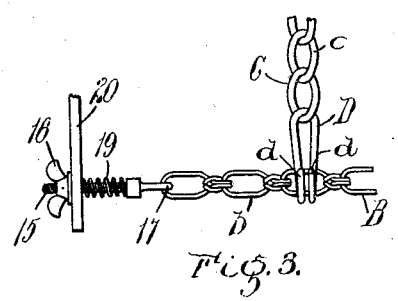
Fig. 3 is a detail view of a portion of a tire chain, the side member thereof having been moved into a position beneath the cross chain.

In performing certain operations of repairing the various links of the chain, and particularly in performing the operations necessary in spreading and closing hook portions d of the connecting links D, it is often desirable that the position of the side members B shall be changed somewhat in order that the latter will not interfere with the manipulation of the tool utilized. In such cases the side chains may be swung downwardly so that they will be positioned entirely beneath the connecting links D as illustrated in Fig. 3, by grasping the handle portions 18 of the hangers and rotating the latter in their respective spreaders. The links b of the side chains B will then be so positioned relatively to the hook portions d of the connecting links D that the tool employed upon said links will not be interfered with.

In removing the chain from the device either or both of the tensioning means described may be loosened.

I claim:—

1. A support for tire chains having, in combination, a frame, spreaders slidably mounted upon said frame at opposite ends thereof, and hangers mounted in said spreaders and adapted to support the side members of a tire chain at the opposite ends thereof, said hangers also being adjustable in said spreaders laterally of said frame to space said side members apart.

2. A support for tire chains having, in combination, a frame, spreaders slidably mounted upon said frame at opposite ends thereof, hangers mounted in said spreaders adjacent to opposite ends thereof, and adapted to support the side members of a tire chain at the opposite ends thereof and hold said side members spaced apart, and means to move said spreaders relatively to each other to simultaneously place a tension upon both of said side members.

3. A support for tire chains having, in combination, a frame, spreaders slidably mounted upon said frame at opposite ends thereof, hangers mounted in said spreaders and adapted to support the side members of a tire chain at the opposite ends thereof, and means to move said spreaders relatively to each other to simultaneously place a tension upon both of said side members, said hangers also being adjustable in said spreaders to place said side members under tension individually.

4. A support for tire chains having, in combination, a frame, spreaders slidably mounted upon said frame at opposite ends thereof, hangers mounted in said spreaders and adapted to support the side members of a tire chain at the opposite ends thereof, and means to move said spreaders relatively to each other to simultaneously place a tension upon both of said side members, said hangers being adjustable laterally of said frame to support said side members.

5. A support for tire chains having, in combination, a frame, spreaders slidably mounted upon said frame at opposite ends thereof, hangers mounted in said spreaders and adapted to support the side members of a tire chain at the opposite ends thereof, and a screw mounted upon one of said spreaders and adapted to position the latter relatively to the other spreader to simultaneously place a tension upon both of said side members.

6. A support for tire chains having, in combination, a frame, a bar slidably mounted in said frame at each end thereof, a spreader rigidly mounted upon one of said bars, means upon said spreader to support a tire chain at one end thereof, a spreader slidably mounted upon the other of said bars, means upon said last-named spreader to support the other end of said tire chain, and means to move said last-named spreader relatively to its supporting bar to place said tire chain under a tension longitudinally thereof.

7. A support for tire chains having, in combination, a frame, a bar slidably mounted in said frame at each end thereof, a spreader rigidly mounted upon one of said bars, hangers mounted upon said spreader to support a tire chain at one end thereof, a spreader slidably mounted upon the other of said bars, screws mounted upon said last-named spreader to support the other end of said tire chain, and means to move said last-named spreader relatively to its supporting bar to place said tire chain under tension longitudinally thereof, said hangers being adjustable in said spreaders to also vary the tension upon said chain.

8. A support for tire chains having, in combination, a frame, a bar slidably mounted in said frame at each end thereof, a spreader rigidly mounted upon one of said bars, hangers mounted upon said spreaders to support a tire chain at one end thereof, a spreader slidably mounted upon the other of said bars, hangers mounted upon said last-named spreader to support the other end of said tire chain, all of said hangers being adjustable laterally of said frame in their respective spreaders, and means to move said last-named spreader relatively to its supporting bar to place said tire chain under tension longitudinally thereof, said hangers also being adjustable in said spreaders longitudinally of said frame to vary the tension upon said chain.

In testimony whereof I have hereunto set my hand.

JOHN P. HOTZ.